(12) United States Patent
Hsiao et al.

(10) Patent No.: US 11,290,739 B2
(45) Date of Patent: Mar. 29, 2022

(54) VIDEO PROCESSING METHODS AND APPARATUSES OF DETERMINING MOTION VECTORS FOR STORAGE IN VIDEO CODING SYSTEMS

(71) Applicant: MEDIATEK INC., Hsinchu (TW)

(72) Inventors: Yu-Ling Hsiao, Hsinchu (TW); Ching-Yeh Chen, Hsinchu (TW); Tzu-Der Chuang, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/296,759

(22) PCT Filed: Nov. 28, 2019

(86) PCT No.: PCT/CN2019/121581
§ 371 (c)(1),
(2) Date: May 25, 2021

(87) PCT Pub. No.: WO2020/108560
PCT Pub. Date: Jun. 4, 2020

(65) Prior Publication Data
US 2021/0360274 A1    Nov. 18, 2021

Related U.S. Application Data

(60) Provisional application No. 62/773,223, filed on Nov. 30, 2018.

(51) Int. Cl.
*H04N 19/51* (2014.01)
*H04N 19/105* (2014.01)
(Continued)

(52) U.S. Cl.
CPC .......... *H04N 19/51* (2014.11); *H04N 19/105* (2014.11); *H04N 19/119* (2014.11); *H04N 19/176* (2014.11)

(58) Field of Classification Search
None
See application file for complete search history.

(56) References Cited

U.S. PATENT DOCUMENTS 10,298,950 B2  5/2019  Wang et al.
10,412,406 B2  9/2019  Zhang et al.
(Continued)

FOREIGN PATENT DOCUMENTS

CN    107534778 A    1/2018
CN    107787582 A    3/2018
(Continued)

OTHER PUBLICATIONS

International Search Report and Written Opinion dated Feb. 1, 2020, issued in application No. PCT/CN2019/121581.
(Continued)

*Primary Examiner* — Christopher G Findley
(74) *Attorney, Agent, or Firm* — McClure, Qualey & Rodack, LLP

(57) ABSTRACT

Video processing methods and apparatuses for coding a current block comprise receiving input data of a current block, splitting the current block into sub-blocks, deriving motion information for the sub-blocks, performing motion compensation for the sub-blocks using the motion information to derive a final predictor, deriving and storing a representative motion vector for each grid in the current block, and encoding or decoding the current block using the final predictor. The representative motion vector for grids in a weighted area is determined by combining the motion vectors of the sub-blocks if the motion vectors of the sub-blocks are in different lists. The representative motion vector for grids in the weighted area is determined as one of the motion vectors of the sub-blocks if the motion vectors of the sub-blocks are in the same list.

17 Claims, 10 Drawing Sheets

(51) Int. Cl.
H04N 19/176 (2014.01)
H04N 19/119 (2014.01)

(56) References Cited

U.S. PATENT DOCUMENTS

| | | | |
|---|---|---|---|
| 10,602,188 B2 | 3/2020 | Alshin et al. | |
| 2011/0129015 A1* | 6/2011 | Nguyen | H04N 19/553 |
| | | | 375/240.16 |
| 2015/0085935 A1* | 3/2015 | Chen | H04N 19/597 |
| | | | 375/240.16 |
| 2018/0070105 A1* | 3/2018 | Jin | H04N 19/172 |
| 2018/0098063 A1 | 4/2018 | Chen et al. | |
| 2020/0120334 A1* | 4/2020 | Xu | H04N 19/105 |
| 2021/0021860 A1* | 1/2021 | Jang | H04N 19/587 |

FOREIGN PATENT DOCUMENTS

| | | |
|---|---|---|
| WO | 2011/013253 A1 | 2/2011 |
| WO | 2015/010317 A1 | 1/2015 |

OTHER PUBLICATIONS

Kudo, S., et al.; "Motion vector prediction methods considering prediction continuity in HEVC" IEEE; Dec. 2016; pp. 1-5.
Chinese language office action dated Mar. 11, 2021, issued in application No. TW 108143594.

* cited by examiner

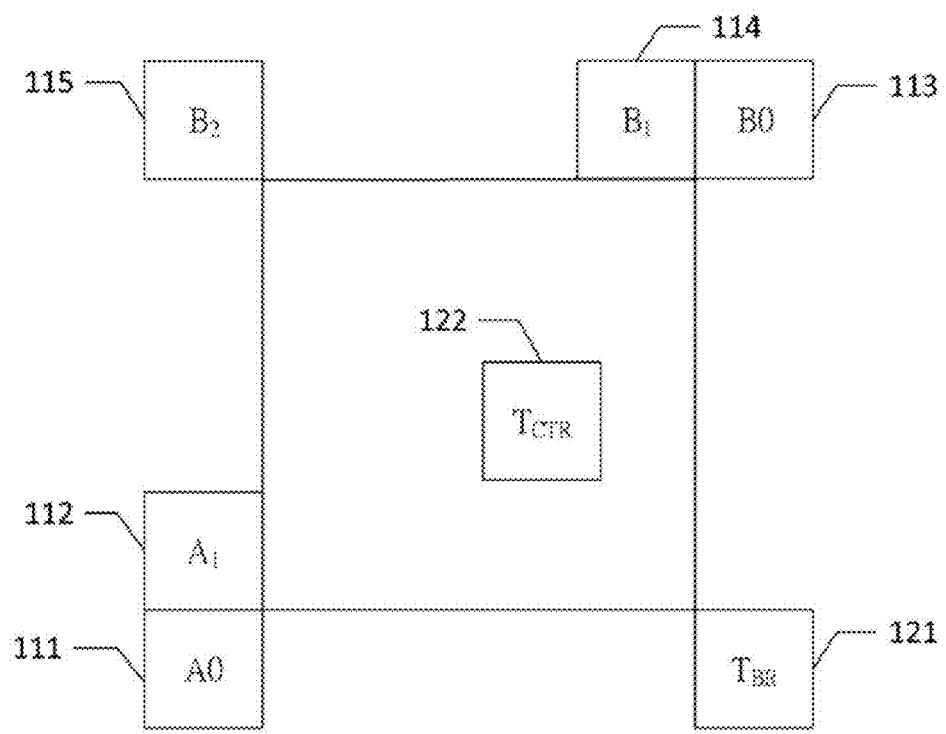
Fig. 1
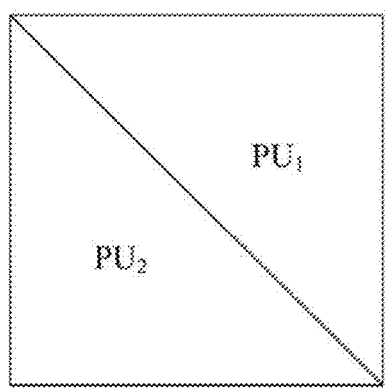 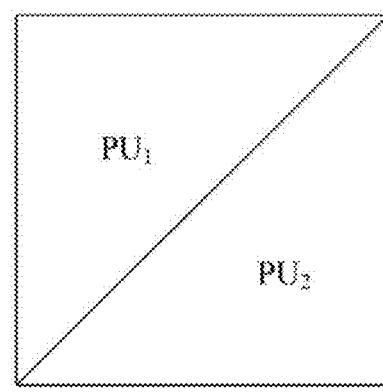
Fig. 2A          Fig. 2B

VIDEO PROCESSING METHODS AND APPARATUSES OF DETERMINING MOTION VECTORS FOR STORAGE IN VIDEO CODING SYSTEMS

CROSS REFERENCE TO RELATED APPLICATION

The present invention claims priority to U.S. Provisional Patent Application, Ser. No. 62/773,223, filed on Nov. 30, 2018, entitled "Methods to Deriving Motion Vector for Triangular Prediction Unit Mode in Video Coding". The U.S. Provisional Patent Application is hereby incorporated by reference in its entirety.

FIELD OF THE INVENTION

The present invention relates to video processing methods and apparatuses in video encoding and decoding systems. In particular, the present invention relates to motion vector derivation for storage for blocks coded in motion compensation.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in HEVC. A raster scan order is used to encode or decode CTUs in each slice. Each CTU may contain one Coding Unit (CU) or recursively split into four smaller CUs according to a quad-tree partitioning structure until a predefined minimum CU size is reached. The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation in inter picture prediction identifies one (uni-prediction) or two (bi-prediction) best reference blocks for a current block in one or two reference pictures, and motion compensation in inter picture prediction locates the one or two best reference blocks according to one or two Motion Vectors (MVs). A difference between the current block and a corresponding predictor is called prediction residual. The corresponding predictor is the best reference block when uni-prediction is used. When bi-prediction is used, the two reference blocks are combined to form the predictor.

Skip and Merge Mode Skip and Merge modes were proposed and adopted in the HEVC standard to increase the coding efficiency of motion information by inheriting motion information from one of spatially neighboring blocks or a temporal collocated block. To code a PU in the Skip or Merge mode, instead of signaling motion information, only an index representing a final candidate selected from a candidate set is signaled. The motion information reused by the PU coded in the Skip or Merge mode includes a MV, an inter prediction indicator, and a reference picture index of the selected final candidate. It is noted that if the selected final candidate is a temporal motion candidate, the reference picture index is always set to zero. Prediction residual are coded when the PU is coded in the Merge mode, however, the Skip mode further skips signaling of the prediction residual as the residual data of a PU coded in the Skip mode is forced to be zero.

A Merge candidate set consists of four spatial motion candidates and one temporal motion candidate derived from spatial neighboring blocks and a collocated block. As shown in FIG. 1, the first Merge candidate is a left predictor $A_1$ 112, the second Merge candidate is a top predictor $B_1$ 114, the third Merge candidate is a right above predictor $B_0$ 113, and a fourth Merge candidate is a left below predictor $A_0$ 111. A left above predictor $B_2$ 115 is included in the Merge candidate set to replace an unavailable spatial predictor. A fifth Merge candidate is a first available temporal predictor selected from $T_{BR}$ 121 and $T_{CTR}$ 122. The encoder selects one final candidate from the candidate set for each PU coded in the Skip or Merge mode based on motion vector compensation such as through a Rate-Distortion Optimization (RDO) decision, and an index representing the selected final candidate is signaled to the decoder. The decoder selects the same final candidate from the candidate set according to the index transmitted in the video bitstream.

Sub-block motion compensation is applied in many recently developed coding tools such as Subblock Temporal Motion Vector Prediction (Subblock TMVP, SbTMVP), Spatial-Temporal Motion Vector Prediction (STMVP), Pattern-based MV Derivation (PMVD), and Affine motion compensation prediction. A CU or a PU is divided into two or more sub-blocks, and these sub-blocks may have different reference pictures and different MVs. During the motion compensation process performed by a video encoder or video decoder, one or more reference blocks have to be retrieved for each block according to motion information. The motion information of coded blocks is stored in a buffer so the motion information may be referenced by spatial or temporal neighboring blocks. When a sub-block motion compensation coding tool is used, motion vectors associated with each sub-block in a current block may be different, and not all the motion vectors are stored for future reference. It is thus desired to develop methods to derive representative motion vectors to be stored for future reference when a current block is split into two or more sub-blocks.

BRIEF SUMMARY OF THE INVENTION

In exemplary embodiments of the video processing method, a video coding system receives input video data associated with a current block in a current picture, splits the current block into a first sub-block and a second sub-block, derives a first MV for the first sub-block and a second MV for the second sub-block, performs motion compensation for the first and second sub-blocks in the current block using the first and second MVs to derive a final predictor for the current block, derives and stores a representative MV for each grid in the current block for future reference, and encodes or decodes the current block according to the final predictor of the current block. Each grid in the current block is either in a non-weighted area or a weighted area. In one example, a size of each grid is equal to 4×4 luma samples. The weighted area includes grids located between the first sub-block and the second sub-block of the current block, and the non-weighted area includes remaining grids in the current block. For example, each grid in the weighted area contains one or more samples within the first sub-block and one or more samples within the second sub-block, whereas each grid in the non-weighted area only contains samples within one of the first and second sub-blocks.

A process of deriving a representative MV for each grid in the current block for storage comprises setting the first MV as the representative MV for grids in the non-weighted area inside the first sub-block and setting the second MV as the representative MV for grids in the non-weighted area inside the second sub-block. For grids in the weighted area, the video encoding or decoding system determines whether the first MV and the second MV are from different lists or from the same list. If the first MV and the second MV are from different lists, a MV combining the first MV and the second MV is set as the representative MV for grids in the weighted area. If the first MV and the second MV are from the same list, one of the first MV and the second MV is set as the representative MV for grids in the weighted area, and the representative MV may be a predefined MV according to an embodiment or the representative MV may be adaptively selected according to another embodiment.

The first MV and the second MV may be derived from a same candidate list or from two different candidate lists. In some embodiments, the first MV and the second MV are uni-prediction MVs while the MV combining the first MV and the second MV is a bi-prediction MV combining the two uni-prediction MVs in different lists. In one embodiment, the first sub-block and the second sub-block are triangular prediction units in the current block, and the current block is a CU splitting by a diagonal direction or an inverse diagonal direction. In some embodiments, the block is split into the first and second sub-blocks by one of predefined splitting types. In yet another embodiment, the current block is split into more than two sub-blocks.

In one embodiment, the second MV is directly set as the representative MV for grids in the weighted area when the first and second MVs are both from List 0 or are both from List 1. In some other embodiments, the representative MV for grids in the weighted area is adaptively selected from the first MV and the second MV according to one or a combination of reference indices of the first and second MVs, reference pictures of the first and second MVs, a splitting direction of the current block, a block height of the current block, a block width of the current block, and an area of the current block when the first and second MVs are both from List 0 or List 1. In one embodiment, the MV with a smaller reference index is selected as the representative MV, and in another embodiment, the MV with a reference picture with a smaller picture order count difference is selected as the representative MV.

The current block is encoded or decoded in Skip or Merge mode according to some embodiments and a size of the current block is larger than or equal to 8×8 luma samples.

In some embodiments, the process of deriving a representative MV for each grid in the current block for storage includes setting the first MV as the representative MV for grids in the non-weighted area inside the first sub-block and setting the second MV as the representative MV for grids in the non-weighted area inside the second sub-block, and setting a bi-prediction MV as the representative MV for grids in the weighted area when the first and second MVs are from different lists or setting a uni-prediction MV as the representative MV for grids in the weighted area when the first and second MVs are from the same list. In one embodiment, the bi-prediction MV set as the representative MV for the weighted area is derived from combining the first MV and the second MV, and the uni-prediction MV set as the representative MV for the weighted area is the first MV or the second MV. For example, the uni-prediction MV is directly set as the second MV when the two MVs are both from List 0 or List 1.

Aspects of the disclosure further provide an apparatus for performing video processing in a video coding system. The apparatus comprises one or more electronic circuits configured for receiving input video data of a current block in a current picture, splitting the current block into a first sub-block and a second sub-block, deriving a first MV for the first sub-block and a second MV for the second sub-block, performing motion compensation for the first and second sub-blocks in the current block using the first and second MVs to derive a final predictor for the current block, deriving and storing a representative MV for each grid in the current block for future reference, and encoding or decoding the current block according to the final predictor of the current block. The first MV is set as the representative MV for grids in a non-weighted area inside the first sub-block and the second MV is set as the representative MV for grids in a non-weighted area inside the second sub-block. The apparatus further determines whether the first and second MVs are from different lists or same list, and a MV combining the first and second MVs is set as the representative MV for grids in a weighted area when the first and second MVs are from different lists. If the first and second MVs are from the same list, one of the first MV and the second MV is set as the representative MV for grids in the weighted area.

Aspects of the disclosure further provide a non-transitory computer readable medium storing program instructions for causing a processing circuit of an apparatus to perform a video processing method to encode or decode a current block. Input video data associated with a current block in a current picture is received to be encoded or decoded, the current block is partitioned into multiple sub-blocks, a final predictor is derived by performing motion compensation for the sub-blocks according to source MVs, a representative MV is determined and stored for each grid in the current block, and the current block is encoded or decoded using the final predictor. The representative MV for grids in a non-weighted area is set to be one of the source MVs based on the grid location, the representative MV for grids in a weighted area is set to be a MV combining the source MVs if the source MVs are from different lists, and the representative MV for grids in the weighted area is set to be one of the source MVs if the source MVs are from the same list. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein:

FIG. 1 illustrates locations of spatial predictors and temporal predictors for constructing a candidate set for the Skip or Merge mode defined in the HEVC standard.

FIGS. 2A and 2B illustrates two examples of splitting a block into two sub-blocks according to a triangular prediction unit mode.

FIGS. 5A and 5B illustrate an example of motion vector storage for a triangular prediction unit coded block split by a diagonal direction and an inverse diagonal direction respectively.

FIGS. 7A to 7C illustrates examples of motion vector storage for blocks split by three different partitioning types when two source motion vectors are from the same list according to an embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Triangular Prediction Unit Mode A triangular prediction unit mode is a sub-block motion compensation coding tool which divides a current block into two sub-blocks by a triangular partition. FIGS. 2A and 2B illustrate two examples of the triangular prediction unit mode splitting each current Coding Unit (CU) into two triangular prediction units in a diagonal or inverse diagonal direction. The current CU in FIG. 2A is partitioned into a first triangular prediction unit $PU_1$ and a second triangular prediction unit $PU_2$ by splitting from a top-left corner to a bottom-right corner and the current CU in FIG. 2B is partitioned into a first triangular prediction unit $PU_1$ and a second triangular prediction unit $PU_2$ by splitting from a top-right corner to a bottom-left corner. The first triangular prediction unit contains a top-right corner if the CU is split from a top-left corner to a bottom-right corner, and the first triangular prediction unit contains a top-left corner if the CU is split from a top-right corner to a bottom-left corner. Each triangular prediction unit in the current CU is inter-predicted using its own uni-predicted motion vector and reference frame index derived from a uni-prediction candidate list. An adaptive weighting process is performed to generate a final predictor for boundary samples at the diagonal edge after predicting the two triangular prediction units in the current CU. Transform and quantization processes are applied to the current CU after the prediction process in the video encoder. The triangular prediction unit mode is only applied to Skip and Merge modes according to some embodiments.

Figures 3, 4A, 4B:
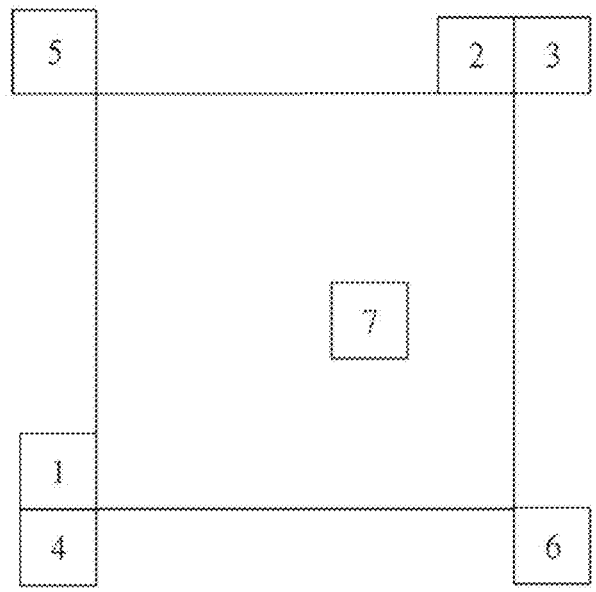
FIG. 3 illustrates an example of neighboring block positions for constructing a uni-prediction candidate list.
FIG. 4A illustrates an example of applying a first weighting factor group to the diagonal edge between two sub-blocks of a luma block coded in a triangular prediction unit mode.
FIG. 4B illustrates an example of applying a first weighting factor group to the diagonal edge between two sub-blocks of a chroma block coded in a triangular prediction unit mode.

Each triangular prediction unit derives motion information from a uni-prediction candidate list consisting five uni-prediction motion vector candidates. The uni-prediction candidate list for a triangular prediction unit in a current CU is derived from seven neighboring blocks of the current CU as shown in FIG. 3. The seven neighboring blocks includes five spatial neighboring blocks marked 1 to 5 in FIG. 3 and two temporal collocated blocks marked 6 to 7 in FIG. 3. The motion vectors of the seven neighboring blocks are collected and put into the uni-prediction candidate list according to an order of uni-prediction motion vectors, List 0 motion vector of bi-prediction motion vectors, List 1 motion vector of bi-prediction motion vectors, and average motion vectors of List 0 and List 1 motion vectors of bi-prediction motion vectors. A zero motion vector is added to the uni-prediction candidate list if the number of candidates is less than five.

Adaptive Weighting Process for Triangular Prediction Unit Mode After obtaining a predictor for each triangular prediction unit in the current CU according to the motion information, an adaptive weighting process is applied to boundary samples at the diagonal edge between the two triangular prediction units to derive a final predictor for the whole CU. Two weighting factor groups are listed as follows. In a first weighting factor group, weighting factors {7/8, 6/8, 4/8, 2/8, 1/8} and {7/8, 4/8, 1/8} are used for luminance (luma) samples and chrominance (chroma) samples respectively. In a second weighting factor group, weighting factors {7/8, 6/8, 5/8, 4/8, 3/8, 2/8, 1/8} and {6/8, 4/8, 2/8} are used for luma samples and chroma samples respectively. One of the weighting factor groups is selected based on a comparison result of motion information of the two triangular prediction units. For example, the second weighting factor group is used when reference pictures of the two triangular prediction units are different or a motion vector difference is larger than 16 pixels; otherwise, the first weighting factor group is used. FIG. 4A illustrates an example of applying an adaptive weighting process to boundary samples at diagonal edge between two triangular prediction units for luma samples. FIG. 4B illustrates an example of applying an adaptive weighting process to boundary samples at diagonal edge between two triangular prediction units for chroma samples. The example shown in FIGS. 4A and 4B demonstrates using the first weighting factor group in the adaptive weighting process. The final predictor for each boundary sample is derived from a weighted sum of a first predictor $P_1$ for the first triangular prediction unit and a second predictor $P_2$ for the second triangular prediction unit. The weighting factors corresponding to the first and second predictors $P_1$ and $P_2$ for samples marked with 1 are 1/8 and 7/8 respectively, and the weighting factors corresponding to $P_1$ and $P_2$ for samples marked with 2 are 2/8 and 6/8 respectively. The final predictor for each sample marked with 1 is $1/8*P_1+7/8*P_2$, and the final predictor for each sample marked with 2 is $2/8*P_1+6/8*P_2$. Samples marked with 4 are located in the middle of the diagonal edge so the weighting factors for $P_1$ and $P_2$ are both 4/8, which is equivalent to applying equal weighting to the two predictors $P_1$ and $P_2$. The final predictor for each sample marked with 4 is therefore $4/8*P_1+4/8*P_2$. Similarly, the weighting factors for samples marked with 6 are 6/8 and 2/8 and the weighting factors for samples marked with 7 are 7/8 and 1/8, so the final predictor for each sample marked with 6 is $6/8*P_1+2/8+P_2$ and the final predictor for each sample marked with 7 is $7/8*P_1+1/8*P_2$.

Representative Motion Information Derivation for Weighted Area in Triangular

Figures 5A, 5B:
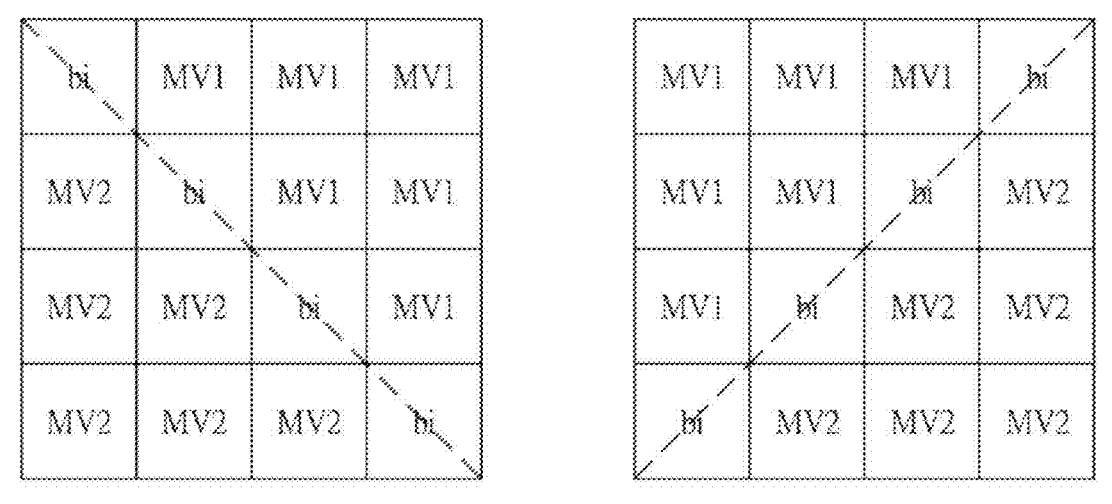

Prediction Unit Mode After the video encoder or decoder performs the prediction process of the triangular prediction unit mode on the current CU, representative motion information of the triangular prediction units in the current CU are stored for each 4×4 grid to be referenced by other blocks. In the following description, the representative motion information may be replaced by the representative motion vector, however, the term "representative motion vector" includes a set of one motion vector, one reference frame index, and one reference direction when the representative motion vector is a uni-prediction motion vector or two sets of motion vectors, reference frame indices, and reference directions when the representative motion vector is a bi-prediction motion vector. FIGS. 5A and 5B illustrates examples of motion vector storage for two 16×16 current blocks coded in a triangular prediction unit mode, the 16×16 current block in FIG. 5A is split by a diagonal direction whereas the 16×16 current block in FIG. 5B is split by an inverse diagonal direction. A first predictor $P_1$ for a first triangular prediction unit in each 16×16 current CU is derived from a uni-prediction motion vector MV1 and a second predictor $P_2$ for a second triangular prediction unit in each 16×16 current CU is derived from a uni-prediction motion vector MV2. The first predictor $P_1$ and the second predictor $P_2$ are also the final predictor for non-weighted area in the current block, and these two predictors generate the final predictor for weighted area in the current block by adaptive weighted averaging. The motion vector MV1 is stored as a representative motion vector for the non-weighted area in the first triangular prediction unit, and the motion vector MV2 is stored as a representative motion vector for the non-weighted area in the second triangular prediction unit. A bi-prediction motion vector is stored as the representative motion vector in the weighted area between the two triangular prediction units. In other words, either a uni-prediction motion vector or bi-prediction motion vector is stored as a representative motion vector of a 4×4 grid depending on the position of the 4×4 grid in the current CU. As shown in FIGS. 5A and 5B, a uni-prediction motion vector, either MV1 or MV2, is stored for each 4×4 grid located in the non-weighted area, and a bi-prediction motion vector is stored for each 4×4 grid located in the weighted area. The bi-prediction motion vector is derived by combining the motion vectors MV1 and MV2.

In cases when the motion vectors MV1 and MV2 are from different reference picture lists (i.e. different reference directions), for example, one MV is from List 0 (i.e., points to a reference picture in List 0) and another MV is from List 1 (i.e., points to a reference picture in List 1), these two motion vectors MV1 and MV2 are simply combined to form a bi-prediction motion vector for storage. In cases when both MV1 and MV2 are from the same list, for example, both MV1 and MV2 are from List 0 direction, a reference picture of MV2 is first checked with the List 1 reference picture list, and if the reference picture of MV2 is the same as one picture in the List 1 reference picture list, MV2 is scaled to the picture in List 1, and a bi-prediction motion vector is formed by combining MV1 in List 0 and the scaled MV2 in List 1. Similarly, if both MV1 and MV2 are from List 1 direction, the reference picture of MV2 is checked with the List 0 reference picture list, and if the reference picture of MV2 is the same as one picture in the List 0 reference picture list, MV2 is scaled to the picture in List 0, and a bi-direction motion vector is formed by combining MV1 in List 1 and the scaled MV2 in List 0. If the reference picture of MV2 does not match with any picture in the other reference picture list, a reference picture of MV1 is checked. For example, if both MV1 and MV2 are from List 0 direction and the reference picture of MV1 is checked with the List 1 reference picture list, and if the reference picture of MV1 is the same as a picture in the List 1 reference picture list, MV1 is scaled to the picture in the List 1 reference picture list. The scaled MV1 and MV2 are combined to form a bi-prediction motion vector for storage. If both the reference pictures of MV1 and MV2 cannot find a match reference picture in the other reference picture list, only the first uni-prediction motion vector MV1 is stored for the weighted area instead of storing a bi-prediction motion vector.

Figure 6A:
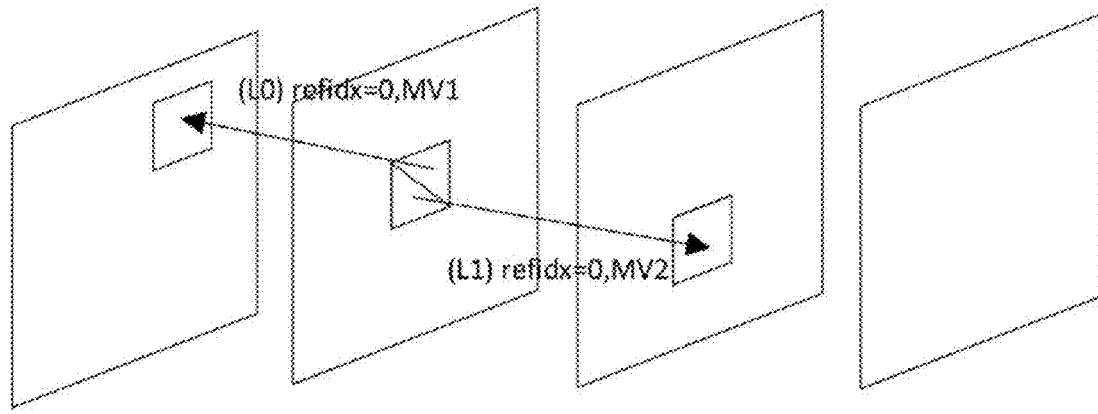
FIGS. 6A to 6D demonstrate examples of derivation of a representative motion vector in four different scenarios.
Figure 6B:
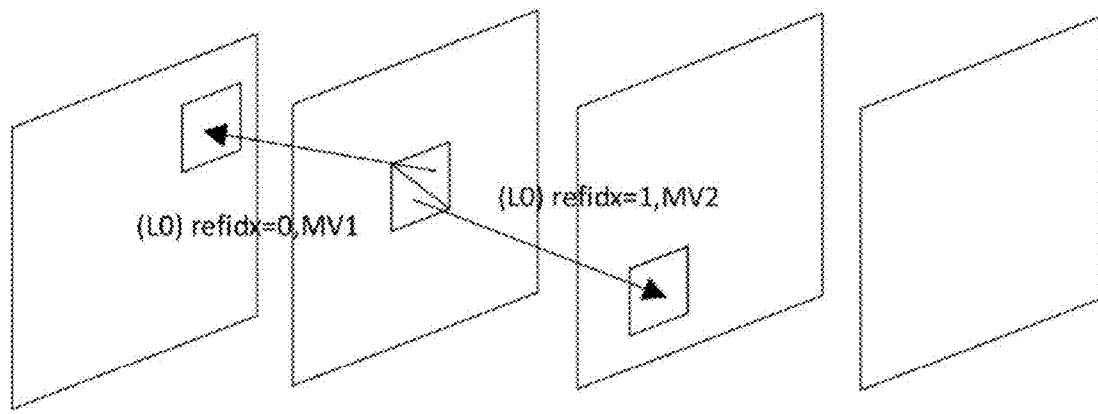
Figure 6C:
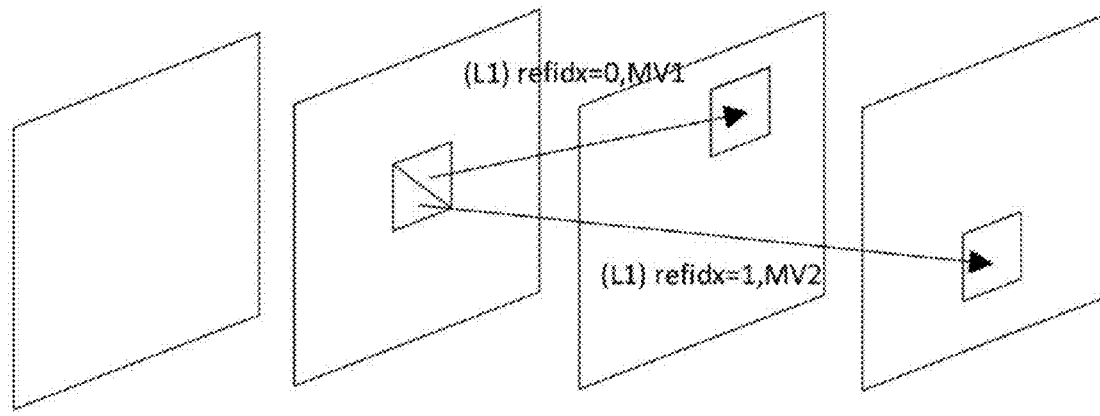
Figure 6D:
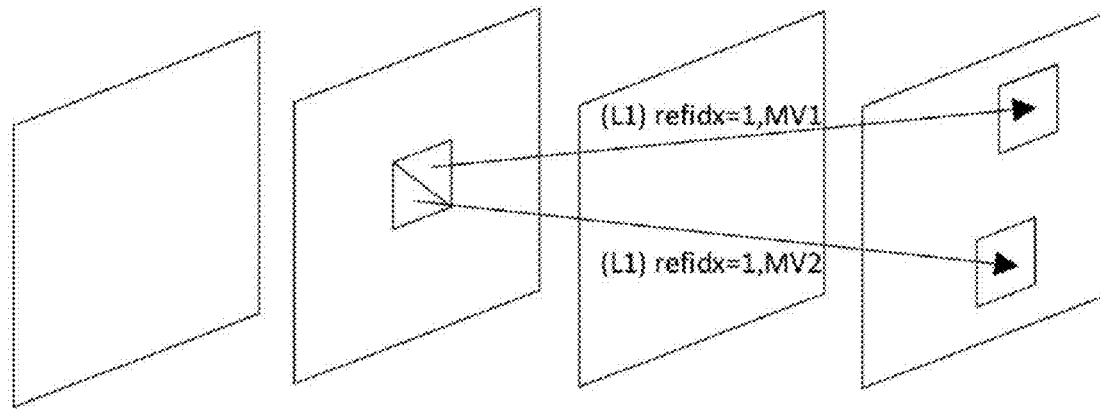

FIGS. 6A, 6B, 6C, and 6D illustrate the four different scenarios of deriving a representative motion vector for each 4×4 grid in the weighted area of a current block coded in a triangular prediction unit mode. The representative motion vector for each 4×4 grid is stored for future reference. In FIGS. 6A to 6D, a current block in a current picture is coded in a triangular prediction unit mode, where the current picture has a Picture Order Count (POC) equal to 4. A List 0 reference picture list contains two reference pictures: POC 0 and POC 8, and a List 1 reference picture list contains two reference pictures: POC 8 and POC 16. In FIG. 6A, the non-weighted area of a first triangular prediction unit is predicted by a first source motion vector MV1 pointed to a reference picture with an index 0 in List 0 (i.e. POC 0), and the non-weighted area of a second triangular prediction unit is predicted by a second source motion vector MV2 pointed to a reference picture with index 0 in List 1 (i.e. POC 8). Since MV1 and MV2 are in different lists, a representative MV for each 4×4 grid in the weighted area is a bi-prediction MV combined from MV1 and MV2. In FIG. 6B, the non-weighted area of a first triangular prediction unit is predicted by MV1 pointed to a reference picture with index 0 in List 0 (i.e. POC 0), and the non-weighted area of a second triangular prediction unit is predicted by MV2 pointed to a reference picture with index 1 in List 0 (i.e. POC 8). In this case, although the two MVs are from List 0, the reference picture POC 8 pointed by MV2 is also included in the List 1 reference picture list, so MV2 is scaled to the reference picture with index 0 in List 1. A representative MV for the weighted area is therefore a bi-prediction MV combined from MV1 in List 0 and the scaled MV2 in List 1. In FIG. 6C, the non-weighted area of a first triangular prediction unit is predicted by MV1 pointed to a reference picture with index 0 in List 1 (i.e. POC 8), and the non-weighted area of a second triangular prediction unit is predicted by MV2 pointed to a reference picture with index 1 in List 1 (i.e. POC 16). In this case, both MVs are from List 1, but the reference picture of MV1 is also included in the List 0 reference picture list, so MV1 is scaled to the reference picture with index 1 in List 0. A representative MV for the weighted area is a bi-prediction MV combined from the scaled MV1 in List 0 and MV2 in List 1. In FIG. 6D, the non-weighted area of a first triangular prediction unit is predicted by MV1 pointed to a reference picture with index 1 in List 1 (i.e. POC 16) and the non-weighted area of a second triangular prediction unit is predicted by MV2 pointed to the same reference picture with index 1 in List 1. These two MVs are from the same list and none of their reference pictures is included in the List 0 reference picture list, a representative MV for the weighted area is therefore a uni-prediction motion vector MV1.

Constraints and Syntax for Triangular Prediction Unit Mode The triangular prediction unit mode is only applied to CUs coded in the Skip or Merge mode. The block size for applying the triangular prediction unit mode cannot be smaller than 8×8. For a current CU coded in the Skip or Merge mode, a CU level flag is signaled to indicate whether the triangular prediction unit mode is applied to the current CU. When applying the triangular prediction unit mode to the current CU, an index indicating a direction of splitting the current CU into two triangular prediction units and motion vectors of the two triangular prediction units are signaled. The index ranges from 0 to 39. A look-up table is used to derive the splitting direction and motion vectors from the index signaled in the video bitstream.

Representative Motion Vector Derivation with Reduced Complexity The representative motion vector derivation for a weighted area in a current block coded in a sub-block motion compensation coding tool such as the triangular prediction unit mode or geometric partitioning may be simplified to reduce the encoder and decoder complexity. The weighted area includes grids between sub-blocks in the current block and the remaining grids are included in the non-weighted area, in one example, a size of each grid is 4×4 luma samples. The triangular prediction unit mode divides a current block into two triangular prediction units while geometric partitioning splits a current block by two coordinate points on the block boundary to more closely follow object boundaries. In the following embodiments, a current block is divided into a first sub-block and a second sub-block according to the triangular prediction unit mode, geometric partitioning or other splitting method of a sub-block motion compensation coding tool. The first sub-block and the second sub-block are predicted by a first motion vector MV1 and a second motion vector MV2. In some embodiments, the first and second motion vectors are uni-prediction motion vectors derived from one or two candidate lists. For example, the first motion vector is derived from a first candidate list constructed for the first sub-block and the second motion vector is derived from a second candidate list constructed for the second sub-block. In another example, the first motion vector and the second motion vector are derived from a same candidate list. Boundary samples between the two sub-blocks may be predicted according to both the motion vectors. For example, a final predictor for the boundary samples is a weighted average of a first predictor derived from the first motion vector and a second predictor derived from the second motion vector.

Figures 7A, 7B, 7C:
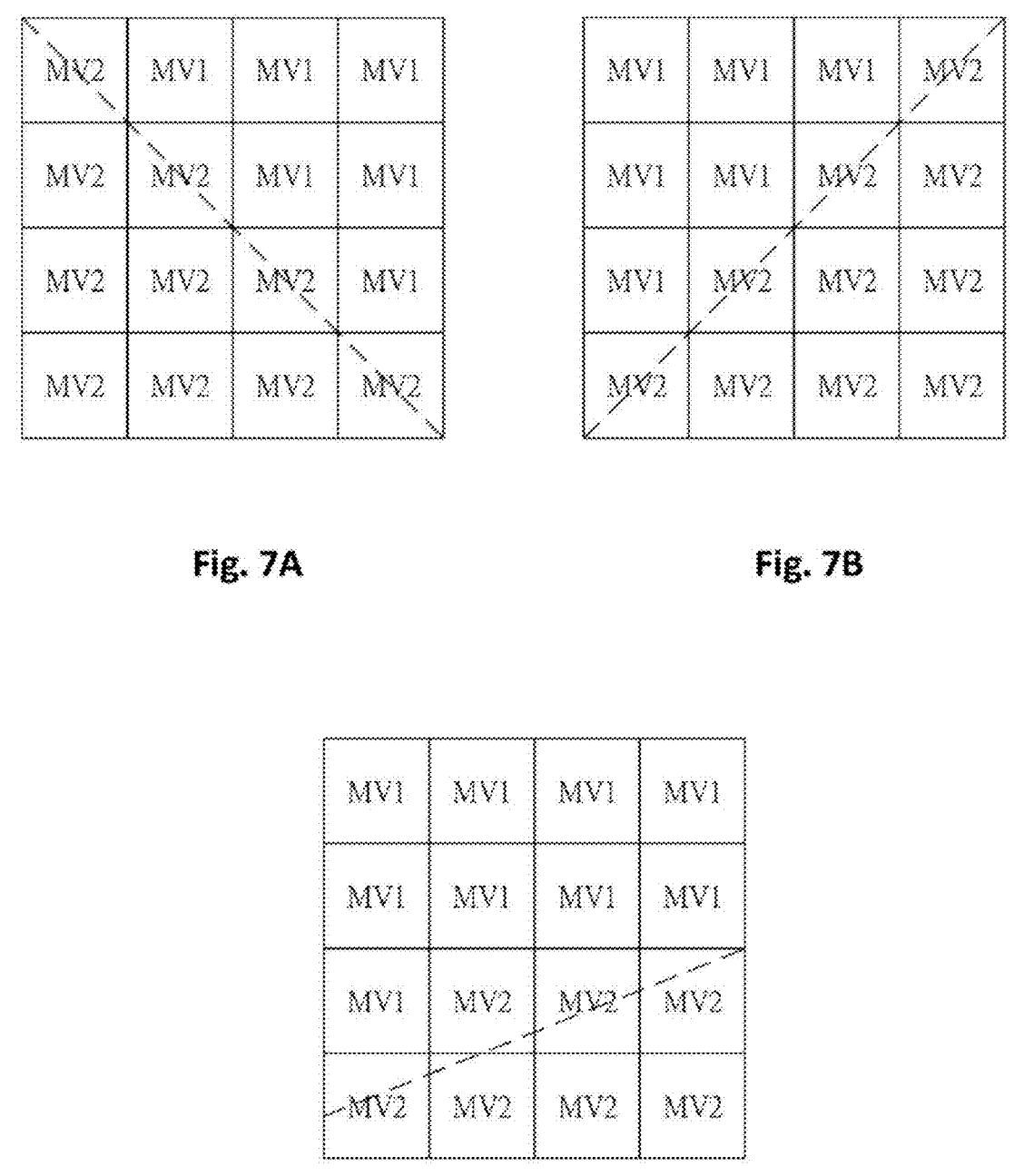

After predicting the current block, a representative motion vector for each grid in the current block is determined and stored for future reference. The grids in the current block are divided into two areas, a weighted area and a non-weighted area. The weighted area includes the grids located between the two sub-blocks of the current block, and the non-weighted area includes the remaining grids in the current block. For example, each grid in the weighted area contains samples within the first sub-block and the second sub-block, whereas each grid in the non-weighted area only contains samples within one of the first and second sub-blocks. A representative motion vector stored for a grid in the non-weighted area is either the first motion vector MV1 or the second motion vector MV2 depending on the location of the grid. For example, the representative motion vector stored for a grid only containing samples within the first sub-block is the first motion vector MV1, whereas the representative motion vector stored for a grid only containing samples within the second sub-block is the second motion vector MV2. In one embodiment, a representative motion vector stored for a weighted area is directly set to one of the source motion vectors MV1 and MV2 when both the source motion vectors MV1 and MV2 are from the same list or the same direction. In one embodiment, the second motion vector MV2 is always stored for the grids in the weighted area when the motion vectors MV1 and MV2 are both List 0 uni-prediction MVs or are both List 1 uni-prediction MVs. In another embodiment, the first motion vector MV2 is always stored for the grids in the weighted area when MV1 and MV2 are from the same list. FIGS. 7A, 7B, and 7C illustrates some examples of representative motion vector derivation for current blocks split into two sub-blocks when two source MVs are from the same list according to an embodiment of the present invention. The current block in FIG. 7A is split by a diagonal direction and the current block in FIG. 7B is split by an inverse diagonal direction, whereas the current block in FIG. 7C is split from a middle point of the most bottom-left grid to a middle point of the right boundary of the current block. In this embodiment, the second motion vector MV2 is assigned as the representative emotion vector for any grid in the weighted area covering the two sub-blocks.

In the previous described embodiments, the current block is split into two sub-blocks; however, the method of deriving representative motion information for storage is also applicable for blocks split into more than two sub-blocks. The weighted area may be defined to include any grid containing samples belong to two or more sub-blocks. Source MVs are derived to predict sub-blocks in the current block, the representative motion information for grids in the weighted area is predefined to be one of the source MVs according to one embodiment, and the representative motion information for grids in the weighted area is adaptively selected from the source MVs according to another embodiment.

In some embodiments of the present invention, the representative motion vector for each grid in the non-weighted area in a current block is always a uni-prediction motion vector, and the representative motion vector for grids in the non-weighted area within a sub-block is the motion vector used for motion compensation for the sub-block. For the weighted area in the current block, the representative motion vector for grids in the weighted area is a bi-prediction motion vector if two source MVs are from different lists, for example, one source MV points to a reference picture in List 0 and another source MV points to a reference picture in List 1. The representative motion vector for grids in the weighted area is a uni-prediction motion vector if all source MVs are from a same list, for example, all source MVs are from List 0 or from List 1. The uni-prediction motion vector stored for the weighted area is predefined as one of the source MVs according to one embodiment, for example, the predefined uni-prediction motion vector is the source MV used for predicting the second sub-block. In another embodiment, the uni-prediction motion vector stored for the weighted area is adaptively determined from the source MVs.

For a block split into two sub-blocks, one of the source motion vectors MV1 and MV2 is selected to be a representative motion vector for grids in the weighted area. The representative motion vector is adaptively selected from MV1 and MV2 according to some embodiments, in one embodiment, the MV with a smaller reference index is selected as the representative MV, in another embodiment, the MV with a reference picture with a smaller picture order count difference is selected as the representative MV. To be more general, the representative motion vector stored for a weighted area may be adaptively selected from source MVs according to one or a combination of a splitting direction of the current block, reference indices of the source MVs, reference pictures of the source MVs, a CU height, a CU width, and a CU area when all the source MVs are from the same list. For example, the first motion vector MV1 is stored as the representative motion vector for the weighted area when the splitting direction is from top-left to bottom-right, and the second motion vector MV2 is stored as the representative motion vector for the weighted area when the splitting direction is from top-right to bottom-left. In another example, MV2 is stored as the representative motion vector for the weighted area when the splitting direction is from top-left to bottom-right and MV1 is stored as the representative motion vector for the weighted area when the splitting direction is from top-right to bottom-left.

In one embodiment, the representative motion vector stored in the weighted area is set to be an averaged MV of the two source MVs when both the source MVs are from the same list. For example, the averaged MV is calculated by averaging MV1 and MV2 scaling to a reference picture pointed by MV1, and a reference index of the average MV is set to the reference index of MV1. In another example, the averaged MV is calculated by averaging MV2 and MV1 scaling to a reference picture pointed by MV2, and a reference index of the average MV is set to the reference index of MV2. In yet another example, the averaged MV is calculated by directly averaging MV1 and MV2 without scaling, and a reference index of the averaged MV is set to the reference index of MV1 or MV2. For example, the reference index of the averaged MV is selected as a smaller reference index or selected as a reference index with a smaller picture order count difference.

Figure 8A:
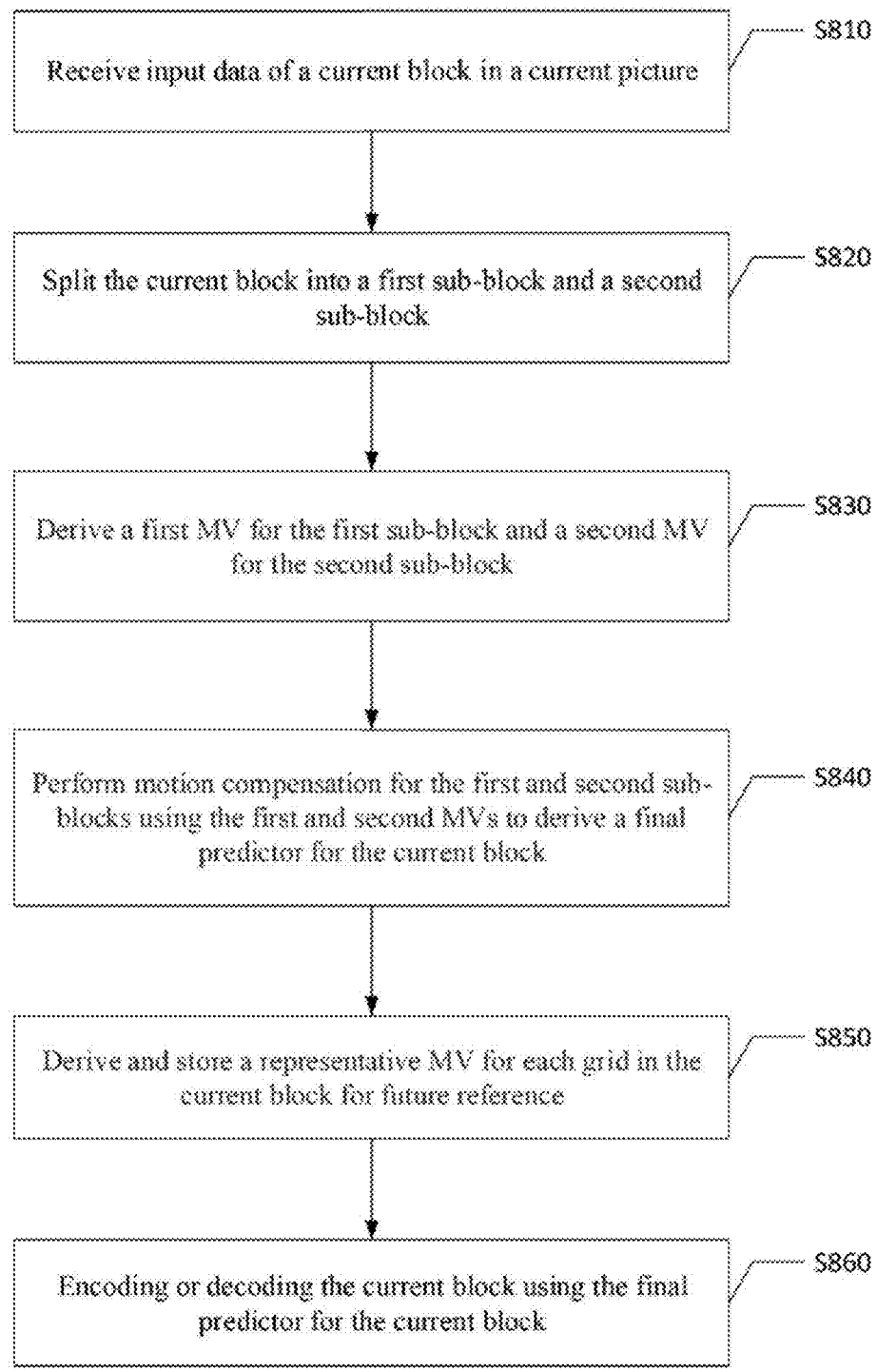
FIG. 8A is a flowchart illustrates an example of processing a current block by a video encoding or decoding system according to an embodiment of the present invention.

Exemplary Flowchart for Encoding or Decoding Process Including Representative Motion Information Derivation FIG. 8A illustrates an exemplary flowchart of a video encoding or decoding system for processing blocks to be encoded or decoded by a motion compensation coding tool according to an embodiment of the present invention. The video encoding or decoding system receives input data associated with a current block in a current picture in Step S810. At the encoder side, the input data corresponds to pixel data to be encoded into a video bitstream; at the decoder side, the input data corresponds to coded data or prediction residual to be decoded. In Step S820, the current block is split into a first sub-block and a second sub-block. In Step S830, the video encoding or decoding system derives a first MV for the first sub-block and derives a second MV for the second sub-block. In one embodiment, the first MV is derived from a candidate list constructed for the first sub-block and the second MV is derived from another candidate list constructed for the second sub-block. In another embodiment, the first and second MVs are both derived from a single candidate list. In Step S840, a final predictor is derived for the current block by performing motion compensation for the first and second sub-blocks using the first MV and the second MV. A representative MV is derived and stored for each grid in the current block for future reference in Step S850. An example of a grid size is 4×4 luma samples, for example, there are 64 4×4 grids in a 32×32 luma block. In Step S860, the video encoding or decoding system encodes or decodes the current block according to the final predictor for the current block.

Figure 8B:
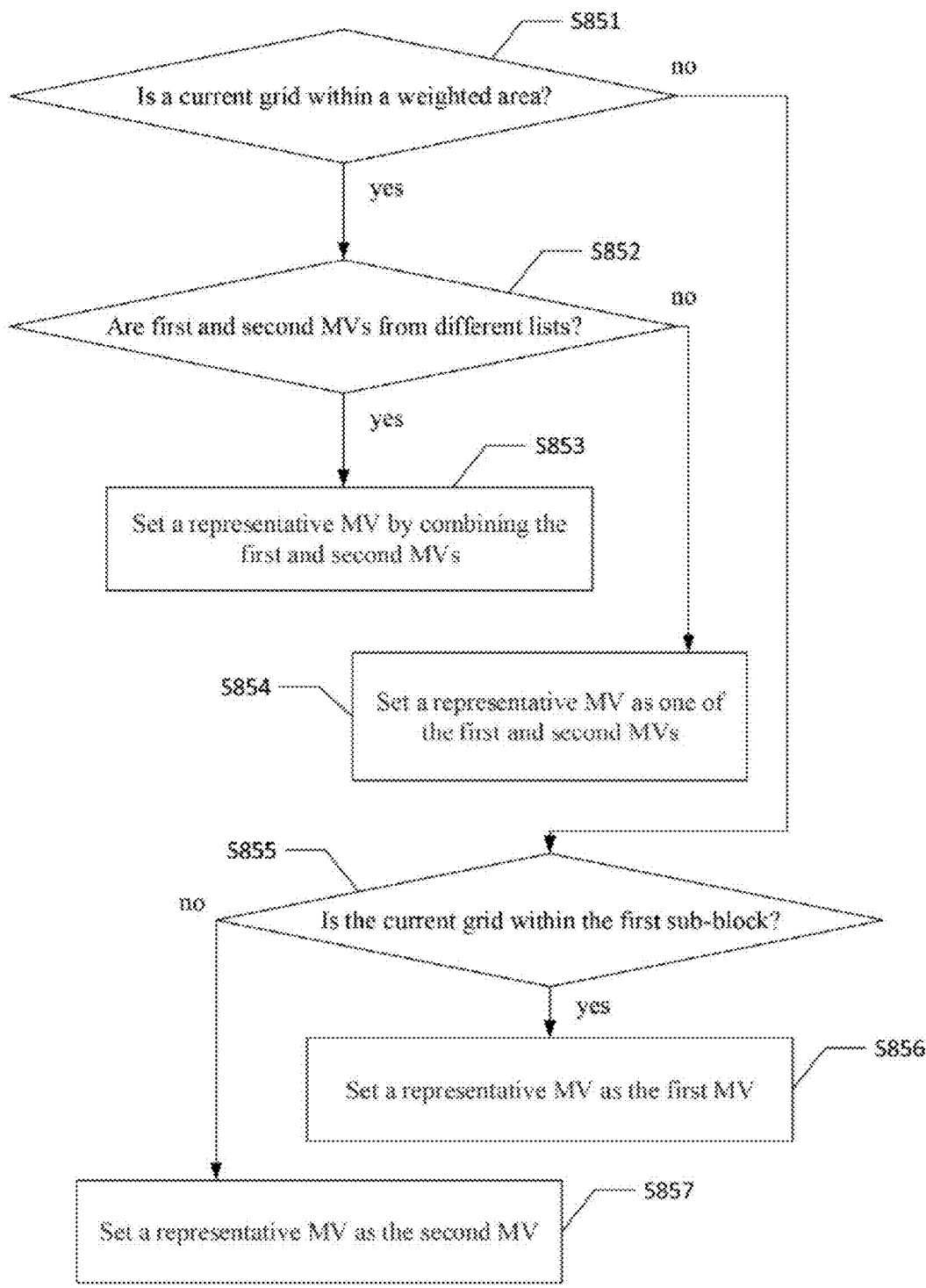
FIG. 8B is a flowchart illustrates an example of deriving a representative motion vector for a current grid in a current block according to an embodiment of the present invention.

The detailed process for deriving a representative MV for each grid in the current block in Step S850 of FIG. 8A is illustrated in the flowchart of FIG. 8B. In Step S851, the video encoding or decoding system checks if a current grid in the current block is within a weighted area. The weighted area includes grids located between the first sub-block and the second sub-block of the current block, and a non-weighted area includes remaining grids in the current block. For example, each grid in the weighted area contains one or more samples within the first sub-block and one or more samples within the second sub-block, whereas each grid in the non-weighted area only contains samples within one of the first and second sub-blocks. If the current grid is within the weighted area, the video encoding or decoding system checks whether the first and second MVs are from different lists in Step S852, and if the two MVs are from different lists, the representative MV for the current grid is set as a MV combining the first MV and the second MV in Step S853. If the first MV and the second MV are from the same list, the representative MV for the current grid is set as one of the first MV and the second MV in Step S854. If the current grid is within a non-weighted area, in Step S855, the encoding or decoding system checks if the current grid is within the first sub-block, and the representative MV for the current grid is set as the first MV in Step S856 if the current grid is within the first sub-block. If the current grid is within the second sub-block, the representative MV for the current grid is set as the second MV in Step S857.

Figure 9:
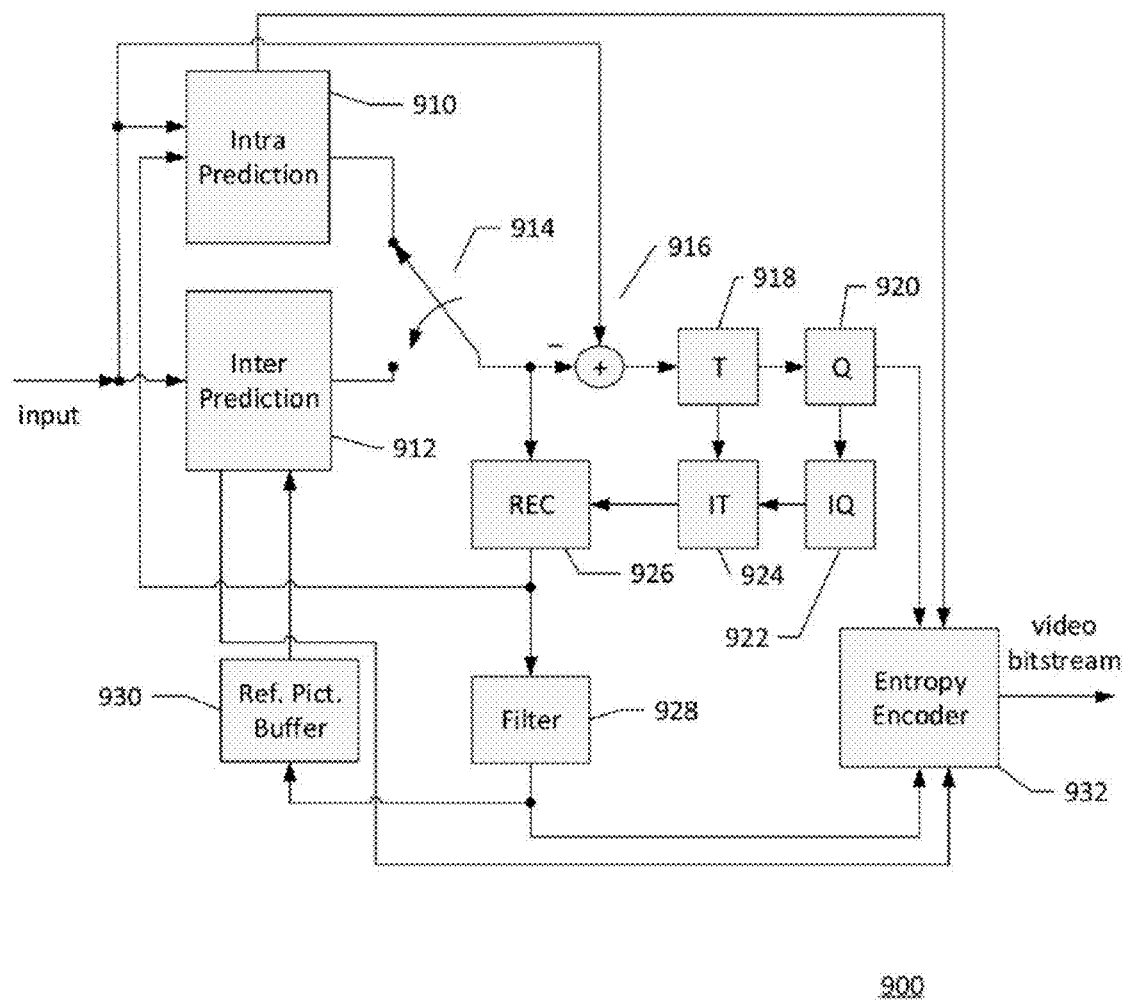
FIG. 9 illustrates an exemplary system block diagram for a video encoding system incorporating the video processing method according to embodiments of the present invention.

Video Encoder and Decoder Implementations The foregoing proposed video processing methods can be implemented in video encoders or decoders. For example, a proposed video processing method is implemented in an inter prediction module of an encoder, and/or an inter prediction module of a decoder. Alternatively, any of the proposed methods is implemented as a circuit coupled to the inter prediction module of the encoder and/or the inter prediction module of the decoder, so as to provide the information needed by the inter prediction module. FIG. 9 illustrates an exemplary system block diagram for a Video Encoder 900 implementing various embodiments of the present invention. Intra Prediction module 910 provides intra predictors based on reconstructed video data of a current picture. Inter Prediction module 912 performs motion estimation (ME) and motion compensation (MC) to provide inter predictors based on video data from other picture or pictures. A current block is split into two or more sub-blocks, and the Inter Prediction module 912 determines motion information for each sub-block and derives a final predictor for the current block using the determined motion information. Representative motion information are derived for each grid in the current block and stored for future reference. Each grid is either in a non-weighted area or a weighted area, and the representative motion information for grids in the non-weighted area is set according to its position. For example, a first MV for a first sub-bock is set as the representative MV for grids in the non-weighted area inside the first sub-block, and a second MV for a second sub-block is set as the representative MV for grids in the non-weighted area inside the second sub-block. For grids in the weighted area, combined motion information is set as the representative motion information if the motion information of the sub-blocks are from different lists, or one of the motion information of the sub-blocks is directly set as the representative MV if the motion information are from the same list. For example, a bi-prediction MV is set as a representative MV for the weighted area if source MVs of the sub-blocks are from different lists, and a uni-prediction MV is set as a representative MV for the weighted area if source MVs of the sub-blocks are from the same list. Either Intra Prediction module 910 or Inter Prediction module 912 supplies the selected predictor to Adder module 916 to form prediction errors, also called prediction residual. The prediction residual of the current block are further processed by Transformation module (T) 918 followed by Quantization module (Q) 920. The transformed and quantized residual signal is then encoded by Entropy Encoder 932 to form a video bitstream. The video bitstream is then packed with side information. The transformed and quantized residual signal of the current block is then processed by Inverse Quantization module (IQ) 922 and Inverse Transformation module (IT) 924 to recover the prediction residual. As shown in FIG. 9, the prediction residual is recovered by adding back to the selected predictor at Reconstruction module (REC) 926 to produce reconstructed video data. The reconstructed video data may be stored in Reference Picture Buffer (Ref. Pict. Buffer) 930 and used for prediction of other pictures. The reconstructed video data recovered from REC 926 may be subject to various impairments due to encoding processing; consequently, In-loop Processing Filter 928 is applied to the reconstructed video data before storing in the Reference Picture Buffer 930 to further enhance picture quality.

Figure 10:
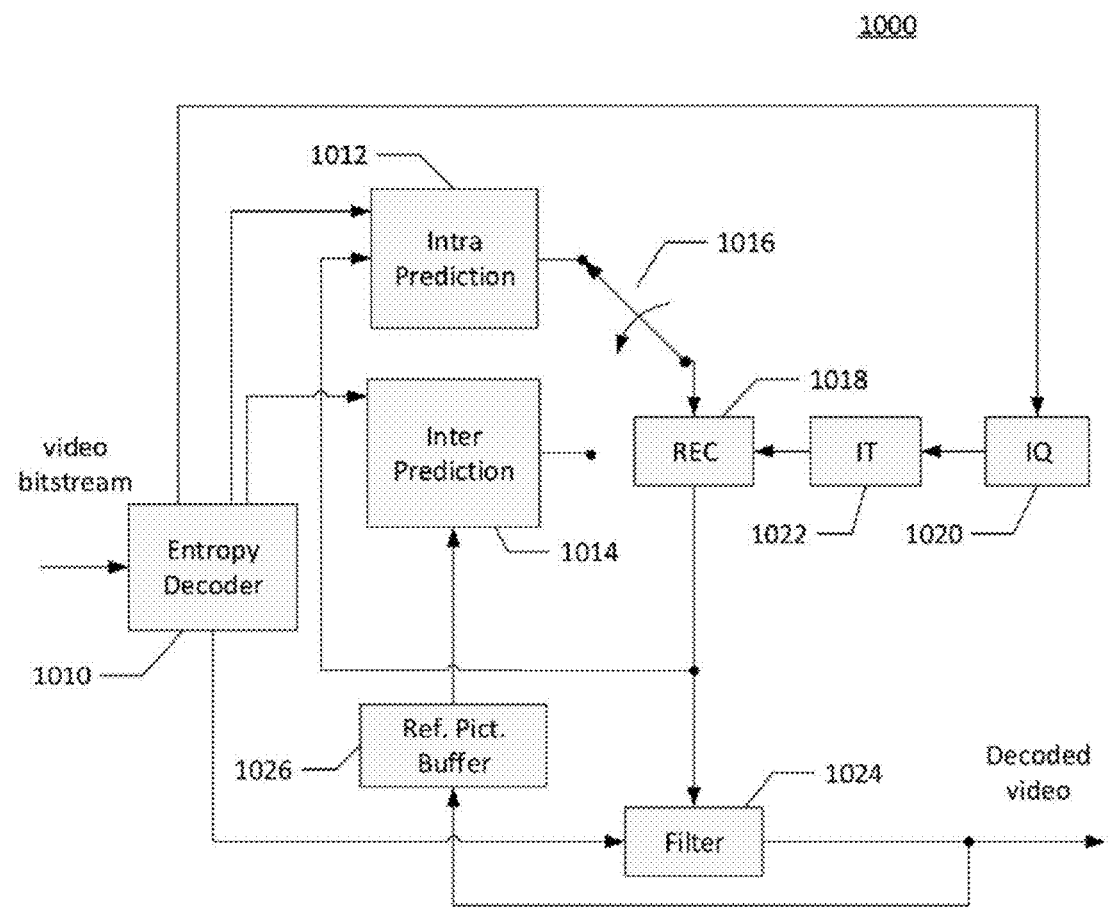
FIG. 10 illustrates an exemplary system block diagram for a video decoding system incorporating the video processing method according to embodiments of the present invention.

A corresponding Video Decoder 1000 for decoding the video bitstream generated from the Video Encoder 900 of FIG. 9 is shown in FIG. 10. The video bitstream is the input to Video Decoder 1000 and is decoded by Entropy Decoder 1010 to parse and recover the transformed and quantized residual signal and other system information. The decoding process of Decoder 1000 is similar to the reconstruction loop at Encoder 900, except Decoder 1000 only requires motion compensation prediction in Inter Prediction module 1014. Each block is decoded by either Intra Prediction module 1012 or Inter Prediction module 1014. Switch module 1016 selects an intra predictor from Intra Prediction module 1012 or an inter predictor from Inter Prediction module 1014 according to decoded mode information. Inter Prediction module 1014 performs a motion compensation coding tool on a current block based on sub-block MVs. According to some embodiments, a representative MV for each grid within a weighted area in the current block is determined according to whether the sub-block MVs are in different lists or the same list. For example, the representative MV for each grid within the weighted area is a MV combining the sub-block MVs if the sub-block MVs are in different lists, or the representative MV for each grid within the weighted area is one of the sub-block MVs if the sub-block MVs are in the same list. The transformed and quantized residual signal associated with each block is recovered by Inverse Quantization module (IQ) 1020 and Inverse Transformation module (IT) 1022. The recovered residual signal is reconstructed by adding back the predictor in REC 1018 to produce reconstructed video. The reconstructed video is further processed by In-loop Processing Filter (Filter) 1024 to generate final decoded video. If the currently decoded picture is a reference picture for later pictures in decoding order, the reconstructed video of the currently decoded picture is also stored in Ref. Pict. Buffer 1026.

Various components of Video Encoder 900 and Video Decoder 1000 in FIG. 9 and FIG. 10 may be implemented by hardware components, one or more processors configured to execute program instructions stored in a memory, or a combination of hardware and processor. For example, a processor executes program instructions to control receiving input data associated with a current block in a current picture. The processor is equipped with a single or multiple processing cores. In some examples, the processor executes program instructions to perform functions in some components in Encoder 900 and Decoder 1000, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 9 and 10, Encoder 900 and Decoder 1000 may be implemented in the same electronic device, so various functional components of Encoder 900 and Decoder 1000 may be shared or reused if implemented in the same electronic device.

Embodiments of the video processing method for encoding or decoding may be implemented in a circuit integrated into a video compression chip or program codes integrated into video compression software to perform the processing described above. For examples, determining a representative MV for each grid in a current block may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
    receiving input data associated with a current block in a current picture;
    splitting the current block into a first sub-block and a second sub-block;
    deriving a first Motion Vector (MV) for the first sub-block and a second MV for the second sub-block;
    performing motion compensation for the first and second sub-blocks in the current block using the first and second MVs to derive a final predictor for the current block;
    deriving and storing a representative MV for each grid in the current block for future reference, wherein each grid is either in a non-weighted area or a weighted area, wherein deriving the representative MV comprises:

setting the first MV as the representative MV for grids in the non-weighted area inside the first sub-block and setting the second MV as the representative MV for grids in the non-weighted area inside the second sub-block;

determining whether the first MV and the second MV are from different lists; and setting a MV combining the first MV and the second MV as the representative MV for grids in the weighted area when the first MV and the second MV are from different lists or setting one of the first MV and the second MV as the representative MV for grids in the weighted area when the first MV and the second MV are from the same list; and encoding or decoding the current block according to the final predictor of the current block.

2. The method of claim 1, wherein the first MV and the second MV are uni-prediction MVs, and the MV combining the first MV and the second MV is a bi-prediction MV combining the two uni-prediction MVs in different lists.

3. The method of claim 1, wherein a size of each grid is equal to 4×4 luma samples.

4. The method of claim 1, wherein the first sub-block and the second sub-block are triangular prediction units in the current block, and the current block is a Coding Unit (CU) splitting by a diagonal direction or an inverse diagonal direction.

5. The method of claim 1, wherein the weighted area includes grids located between the first sub-block and the second sub-block of the current block, and the non-weighted area includes remaining grids in the current block.

6. The method of claim 5, wherein each grid in the weighted area contains one or more samples within the first sub-block and one or more samples within the second sub-block, and each grid in the non-weighted area only contains samples within one of the first and second sub-blocks.

7. The method of claim 1, wherein the first MV and the second MV are derived from a same candidate list or two different candidate lists.

8. The method of claim 1, wherein the second MV is directly set as the representative MV for grids in the weighted area when the first and second MVs are both from List 0 or are both from List 1.

9. The method of claim 1, wherein setting one of the first MV and the second MV as the representative MV for grids in the weighted area further comprising selecting the MV with a smaller reference index, or selecting the MV with a reference picture with a smaller picture order count difference.

10. The method of claim 1, wherein setting one of the first MV and the second MV as the representative MV for grids in a weighted area further comprises selecting the MV according to one or a combination of a splitting direction of the current block, reference indices of the first and second MVs, a block height of the current block, a block width of the current block, and an area of the current block.

11. The method of claim 1, wherein the current block is encoded or decoded in Skip or Merge mode.

12. The method of claim 11, wherein a size of the current block is larger than or equal to 8×8 luma samples.

13. A method of processing video data in a video coding system, comprising:

receiving input data associated with a current block in a current picture;

splitting the current block into a first sub-block and a second sub-block;

deriving a first Motion Vector (MV) for the first sub-block and a second MV for the second sub-block;

performing motion compensation for the first and second sub-blocks in the current block according to the first and second MVs to derive a final predictor for the current block;

deriving and storing a representative MV for each grids in the current block for future reference, wherein each grid is either in a non-weighted area or a weighted area, wherein deriving the representative MV comprises:

setting the first MV as the representative MV for grids in the non-weighted area inside the first sub-block and setting the second MV as the representative MV for grids in the non-weighted area inside the second sub-block;

determining whether the first MV and the second MV are from different lists; and setting a bi-prediction MV as the representative MV for grids in the weighted area when the first MV and the second MV are from different lists or setting a uni-prediction MV as the representative MV for grids in the weighted area when the first MV and the second MV are from the same list; and encoding or decoding the current block according to the final predictor of the current block.

14. The method of claim 13, wherein the bi-prediction MV set as the representative MV is derived from combining the first MV and the second MV, and the uni-prediction MV set as the representative MV is one of the first MV and the second MV.

15. The method of claim 14, wherein the uni-prediction MV is directly set as the second MV when the first and second MVs are both from List 0 or are both from List 1.

16. An apparatus of processing video data in a video coding system, the apparatus comprising one or more electronic circuits configured for:

receiving input data associated with a current block in a current picture;

splitting the current block into a first sub-block and a second sub-block;

deriving a first Motion Vector (MV) for the first sub-block and a second MV for the second sub-block;

performing motion compensation for the first and second sub-blocks in the current block using the first and second MVs to derive a final predictor for the current block;

deriving and storing a representative MV for each grid in the current block for future reference, wherein each grid is either in a non-weighted area or a weighted area, wherein deriving the representative MV comprises:

setting the first MV as the representative MV for grids in the non-weighted area inside the first sub-block and setting the second MV as the representative MV for grids in the non-weighted area inside the second sub-block;

determining whether the first MV and the second MV are from different lists; and setting a MV combining the first MV and the second MV as the representative MV for grids in the weighted area when the first MV and the second MV are from different lists or setting one of the first MV and the second MV as the representative MV for grids in the weighted area when the first MV and the second MV are from the same list; and encoding or decoding the current block according to the final predictor of the current block.

17. A non-transitory computer readable medium storing program instruction causing a processing circuit of an apparatus to perform a video processing method for video data, and the method comprising:
- receiving input data associated with a current block in a current picture;
- splitting the current block into a first sub-block and a second sub-block;
- deriving a first Motion Vector (MV) for the first sub-block and a second MV for the second sub-block;
- performing motion compensation for the first and second sub-blocks in the current block using the first and second MVs to derive a final predictor for the current block;
- deriving and storing a representative MV for each grid in the current block for future reference, wherein each grid is either in a non-weighted area or a weighted area, wherein deriving the representative MV comprises:
  - setting the first MV as the representative MV for grids in the non-weighted area inside the first sub-block and setting the second MV as the representative MV for grids in the non-weighted area inside the second sub-block;
- determining whether the first MV and the second MV are from different lists; and
- setting a MV combining the first MV and the second MV as the representative MV for grids in the weighted area when the first MV and the second MV are from different lists or setting one of the first MV and the second MV as the representative MV for grids in the weighted area when the first MV and the second MV are from the same list; and
- encoding or decoding the current block according to the final predictor of the current block.

* * * * *